July 11, 1939.                C. H. KING                2,165,896
                           CLOSURE FASTENER
                   Filed April 23, 1938          3 Sheets-Sheet 1
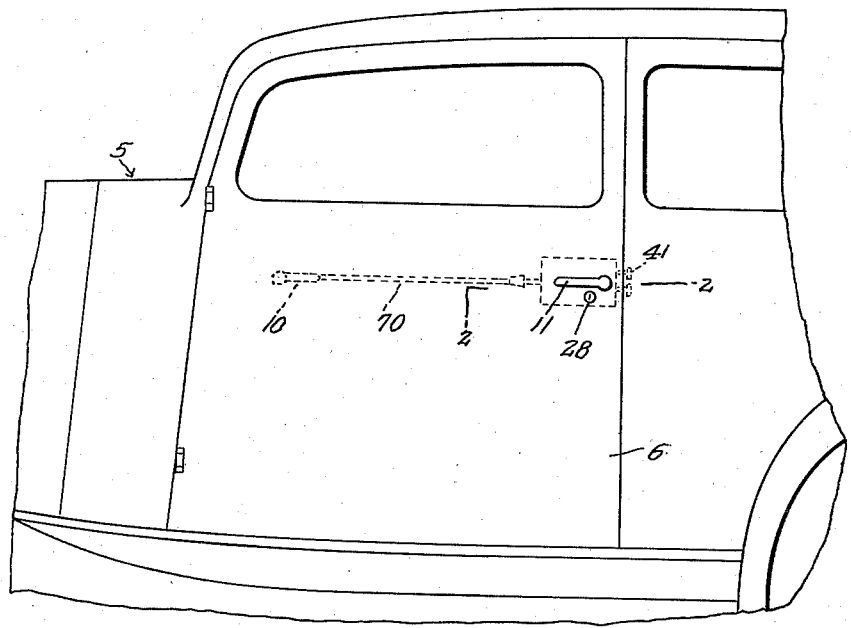
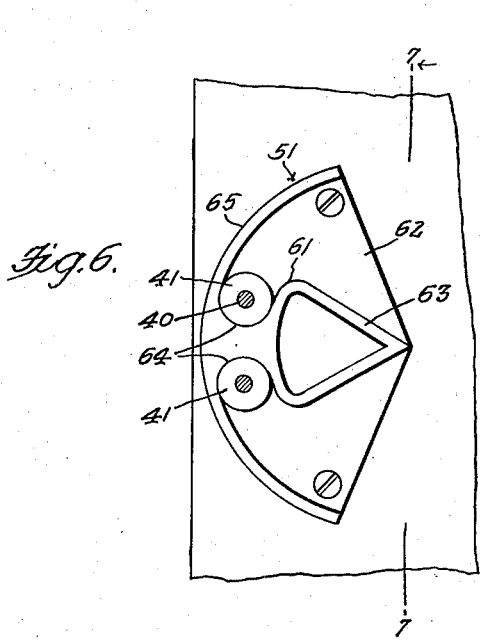
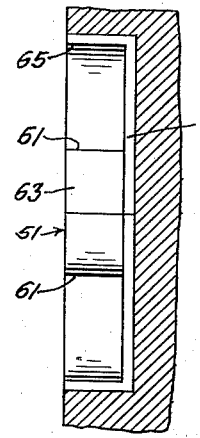
Inventor
Clyde H. King,
By Clarence A. O'Brien
and Hyman Berman
Attorneys July 11, 1939.   C. H. KING   2,165,896
CLOSURE FASTENER
Filed April 23, 1938   3 Sheets-Sheet 2

Inventor
Clyde H. King,

By Clarence A. O'Brien
and Hyman Berman
Attorneys

July 11, 1939.　　　　C. H. KING　　　　2,165,896
CLOSURE FASTENER
Filed April 23, 1938　　　　3 Sheets-Sheet 3

Inventor
Clyde H. King,

By Clarence A. O'Brien
and Hyman Berman
Attorneys

Patented July 11, 1939

2,165,896

UNITED STATES PATENT OFFICE 2,165,896

CLOSURE FASTENER

Clyde H. King, Sevierville, Tenn., assignor of one-fourth to Ralph M. Denton and Burt Ketner, both of Sevierville, Tenn., one-fourth to W. R. Stuebing, Cincinnati, Ohio, and one-fourth to S. J. Milligan, Greeneville, Tenn.

Application April 23, 1938, Serial No. 203,924

2 Claims. (Cl. 292—1)

This invention appertains to new and useful improvements in closure fasteners and more particularly to an automobile door fastener.

The principal object of the present invention is to provide a door fastener especially adapted for automobiles which will be more easy to operate than the present types of door fasteners and which will serve to hold the door tight against rattling.

Another important object of the invention is to provide a door fastener which does not require as much energy to operate as the present types of door fasteners and which is associated with the usual door lock in such a manner as to be made inoperative when the door is locked.

These and other important objects and advantages of the invention will become apparent to the reader of the following specification.

In the drawings:

Figure 1 represents a fragmentary side elevational view of an automobile equipped with the novel fastening means.

Figure 6 is a fragmentary elevational view showing the keeper and the rollers with the stems of the rollers in section.

Figure 7 is a sectional view taken substantially on the line 7—7 of Figure 6.

Figure 2:
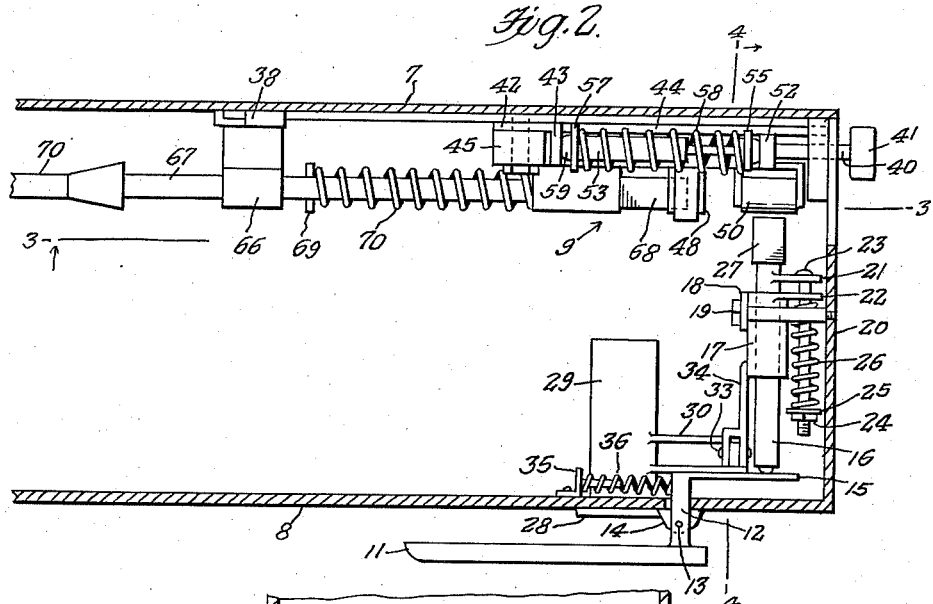
Figure 2 is an enlarged detailed sectional view taken substantially on the line 2—2 of Figure 1.
Figure 4:
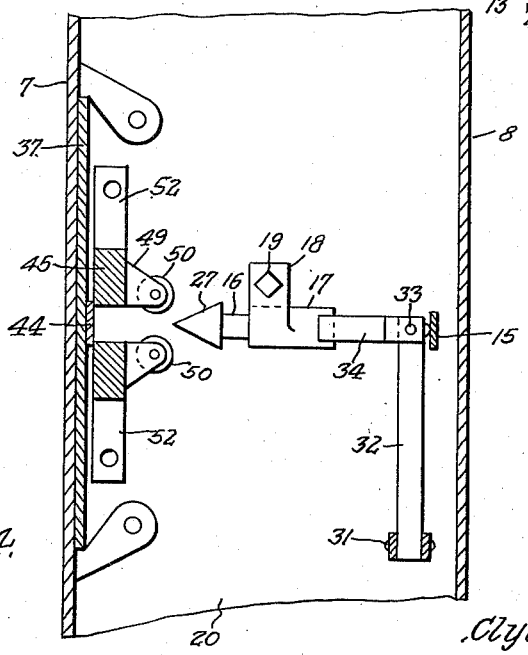
Figure 4 is a fragmentary sectional view taken substantially on the line 4—4 of Figure 2.

Referring to the drawings wherein like numerals designate like parts, it can be seen in Figure 1 that numeral 5 generally refers to a conventional closed body type automobile equipped with doors 6.

As is shown in Figure 2, the door 6 has the inner wall 7 and the outer wall 8. Numeral 9 generally refers to the rollers carrying assembly which can be either operated by the handle 10 at the inside of the door or the handle 11 at the outside. The handle 11 is provided with the shank 12 pivotally secured as at 13 to the ears 14 on the wall 8. The inner end of this shank 12 is provided with a laterally disposed finger 15 passing in front of the push member 16 which is slidably disposed through the barrel 17, the barrel 17 is provided with the upstanding lug 18 through which the pin or bolt 19 extends for swingably supporting the barrel 17 by the end wall 20. As is shown in Figure 2, the plunger 16 and the barrel 17 are provided with closely spaced and parallel lugs 21—22 through which the pin 23 extends, this pin having a threaded portion on which the nut 24 is located, holding the washer 25, and between this washer and the lug 22 is a coiled compressible spring 26 for urging the plunger 16 outwardly and against the finger 15.

The inner end of the plunger 16 is provided with the wedge-shaped head 27.

Numeral 28 represents the usual door lock, the cylinder 29 of which when rotated to lock the door, will swing the arms 30 thereof. These arms are pivotally secured as at 31 to the link 32 and this link in turn is pivotally secured as at 33 to the arm 34 which projects from the barrel 17. Thus it can be seen, that when the cylinder 29 is rotated the link 32 will move the plunger 16 out of the path of the finger 15, so that when the door is locked, the handle 11 can be freely moved without affecting the plunger 16 and the resulting opening of the door. A bracket 35 is provided on the inside of the wall 8 and between this and the shank 12 of the handle 11 is the coiled compressible spring 36.

The assembly 9 consists of a plate 37 secured to the wall 7 by suitable cleats 38. This plate 37 is provided with a laterally disposed flange 39 through which the stems 40—40 carrying the rollers 41—41 extend, the rollers extending beyond the end wall 20 of the door as suggested in both Figures 2 and 3.

Figure 3:
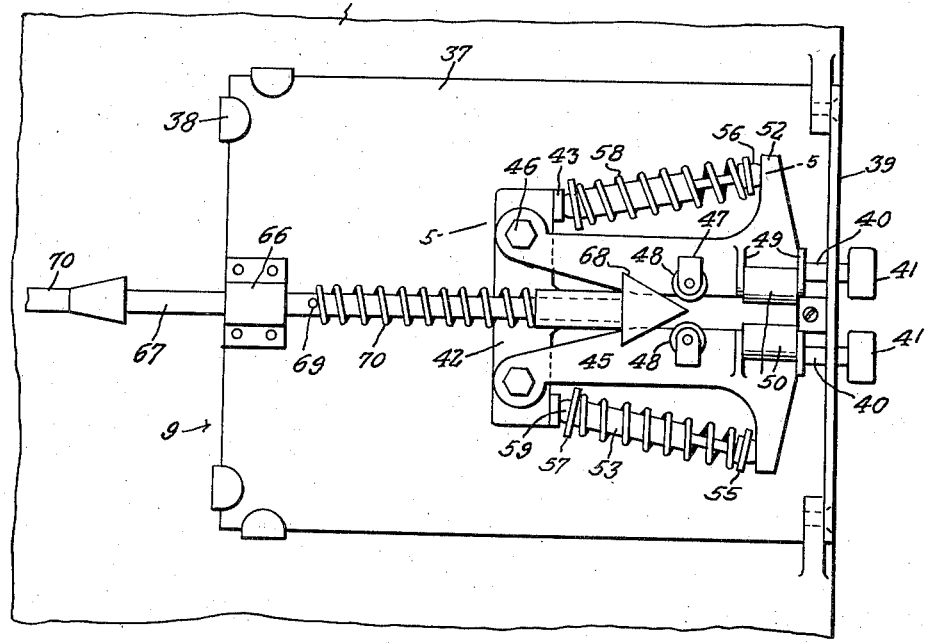
Figure 3 is a fragmentary elevational view of the rollers carrying assembly.
Figure 8:
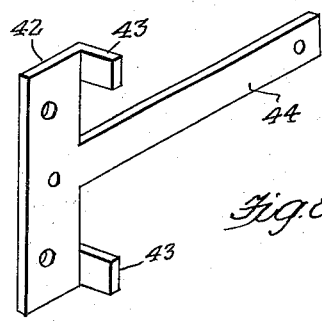
Figure 8 is a perspective view of the rollers assembly bracket.

Referring to Figure 3, it can be seen that the assembly 9 further consists of a bracket structure such as shown in Figure 8 and which the construction involves a narrow vertically disposed plate 42 secured to the plate 37, this plate 42 being provided with a lug 43 at both its upper and lower end portions, while extending from this intermediate portion is the strip 44 suitably secured to the plate 37.

A pair of arms 45—45 are pivotally secured each at one end as at 46 to the plate 42 and these arms are provided at their intermediate portions, each with a boss 47, bifurcated to accommodate a roller 48, these rollers being in opposed relation. A pair of ears 49 are provided on each free end of the arms 45 and between these ears 49 are the rollers 50, said rollers being in opposed relation and adapted to be engaged by the head 27 of the plunger 16 when operated by the handle 11, for swinging the arms 45 apart and spreading the rollers 41—41 to a position where they can be disengaged from the keeper generally referred to by numeral 51.

Figure 5:
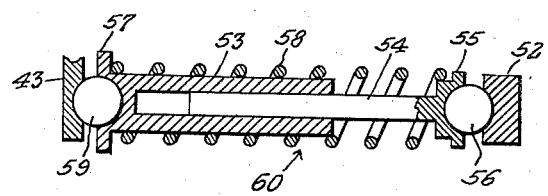
Figure 5 is a sectional view taken substantially on the line 5—5 of Figure 3.

As shown in Figure 3, the upper arm 45 has an upwardly extending finger 52 and the lower arm has a downwardly extending finger 52. Tensioning means as shown in Figure 5 is interposed between the lugs 43 of the plate 42 and the fingers 52 of the arms 45 and each of these tensioning units consists of a barrel 53 receiving one end of the plunger 54. The other end of the plunger is provided with a concaved head 55 between which and a cavity in the arm 52 is interposed a ball bearing 56. The closed end of the barrel 53 is provided with the head 57 between which and the head 55 the coiled compressible spring 58 is interposed. Interposed between the cavity in the head 57 and a cavity in the corresponding lug 43 on the plate 42 is the ball bearing 59. Thus it can be seen, that the tensioning unit which in Figure 5 is generally referred to by numeral 60 serves to urge the fingers 45—45 together and maintain the rollers 41—41 engaged behind the shoulders 61—61 in the keeper 51. The keeper consists of the plate 62 on which is the inwardly tapering formation 63 merging with the shoulders 61—61. Beyond the shoulders in an inward direction are the recesses 64 for receiving the rollers 41. The plate 62 is provided with guide flanges 65.

Extending through suitable guide means 66 is the rod 67 which has the wedge-shaped head 68 capable of engaging between the rollers 48—48 for separating the arms 45—45 so as to disengage the rollers 41—41 from behind the shoulders 61—61.

Between the cross pin 69 and the head 68 is the coiled compressible spring 70 serving to hold the head 68 away from the rollers 48.

Numeral 70 represents the operating rod for engaging the rod 67 and this may also be disposed through suitable guide means and is operated by the handle 10 at the inside of the door.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. Latch operating mechanism for door latches and for use with a rotary barrel lock, comprising a handle swingably movable, a sliding latch operating bolt adapted for swinging adjustment bodily into and out of the path of movement of said handle for projection under movement of said handle when in said path and for disabling of said bolt when out of said path, and means to adjust said bolt into and out of said path comprising a mounting therefor swingable in opposite directions, respectively, spring means tensioning said bolt against projection, and operating connections between said barrel and mounting whereby rotation of said barrel swings said mounting in a direction to adjust said bolt out of said path.

2. Latch operating mechanism for door latches and for use with a rotary barrel lock, comprising a handle swingably movable, a sliding latch operating bolt adapted for swinging adjustment bodily into and out of the path of movement of said handle for projection under movement of said handle when in said path and for disabling of said bolt when out of said path, and means to adjust said bolt into and out of said path comprising a mounting therefor swingable in opposite directions, respectively, spring means tensioning said bolt against projection, and operating connections between said barrel and mounting whereby rotation of said barrel swings said mounting in a direction to adjust said bolt out of said path, said connections comprising a pair of arms extending from said barrel and mounting, respectively, and a link connecting said arms.

CLYDE H. KING.